United States Patent

Lux et al.

Patent Number: 5,414,064
Date of Patent: May 9, 1995

[54] PREPARATION OF HOMOPOLYMERS OF ETHYLENE OR COPOLYMERS OF ETHYLENE

[75] Inventors: Martin Lux, Dannstadt-Schauernheim; Guido Funk, Worms; Roland Saive, Ludwigshafen; Hans-Helmut Goertz, Freinsheim; Rainer Konrad, Goennheim, all of Germany

[73] Assignee: BASF Atkiengesellschaft, Ludwigshafen, Germany

[21] Appl. No.: 274,692

[22] Filed: Jul. 14, 1994

[30] Foreign Application Priority Data

Jul. 31, 1993 [DE] Germany .................. 43 25 824.7

[51] Int. Cl.$^6$ .................................. C08F 2/34
[52] U.S. Cl. ............................ 526/215; 526/220; 526/901; 526/904
[58] Field of Search .............. 526/215, 220, 901, 904

[56] References Cited

U.S. PATENT DOCUMENTS 5,283,278  2/1994  Daire et al. .................. 524/399

FOREIGN PATENT DOCUMENTS 005215  11/1979  European Pat. Off. .

*Primary Examiner*—Joseph L. Schofer
*Assistant Examiner*—Jeffrey T. Smith
*Attorney, Agent, or Firm*—Keil & Weinkauf

[57] ABSTRACT

Homopolymers of ethylene or copolymers of ethylene with minor amounts of other $C_3$–$C_{12}$-alk-1-enes are prepared by catalytic polymerization in a suspension or in the gas phase in the presence of an antistatic agent at from 50 to 120° C. and from 5 to 50 bar by a process in which the antistatic agent used is a mixture of the following substances:

a) a metal salt of medialanic acid of the formula (I)

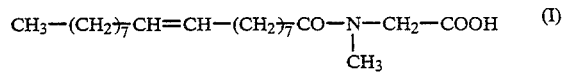

b) a metal salt of an anthranilic acid of the general formula (II)

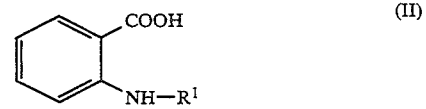

where the organic radical $R^1$ is either $$\alpha)\text{—CO—}(CH_2)_x\text{—}CH_3 \qquad (II\alpha)$$

or $$\beta)\text{—CO—}(CH_2)_y\text{—}CH=CH\text{—}(CH_2)_z\text{—}CH_3 \qquad (III\beta)$$

and x, y and z are each an integer and are from 6 to 18 for x, from 1 to 16 for y, from 1 to 16 for z and from 4 to 17 for y+z, and c) a polyamine obtainable by reacting epichlorohydrin and an aliphatic primary monoamine or an N-alkylalkylenediamine of the general formula (IV)

$$R^2NH\text{—}R^3\text{—}NH_2 \qquad (IV),$$

where
$R^2$ is $C_8$–$C_{24}$-alkyl and
$R^3$ is $C_2$–$C_6$-alkylene.

9 Claims, No Drawings

PREPARATION OF HOMOPOLYMERS OF ETHYLENE OR COPOLYMERS OF ETHYLENE

The present invention relates to a process for the preparation of homopolymers of ethylene or copolymers of ethylene with minor amounts of other $C_3$–$C_{12}$-alk-1-enes by catalytic polymerization in a suspension or in the gas phase in the presence of an antistatic agent at from 50° to 120° C. and from 5 to 50 bar.

The present invention furthermore relates to an antistatic agent.

Processes for the preparation of polymers of ethylene in the gas phase or in a suspension have been described in many publications (U.S. Pat. No. 4 012 573, U.S. Pat. No. 4 427 573, EP-A 110 087, EP-A 230 019, EP-A 260 647 and GB-A 841 263).

It is also known that such polymerization processes are carried out in the presence of antistatic agents in order to prevent undesirable deposition of polymers on the reactor wall (U.S. Pat. Nos. 3,919,185, 4,182,810, 4,532,311, 5,026,795, DE-A 3 543 360, EP-A 107 127, EP-A 229 368 and EP-A 232 701). Such deposition is caused in particular by the fact that the polymers being formed can become electrostatically charged during the polymerization, which may lead to adhesion of these polymers to the reactor wall. As a consequence of this deposition, it is observed, inter alia, that the heat removal capacity of the reactor wall is reduced, the polymerization capacity in the reactor is decreased and finally the polymers present in the reactor fuse together, making it necessary to terminate the polymerization.

Although it is possible effectively to suppress the deposition on the wall of the reactor with the aid of the conventional processes for using antistatic agents in polymerization processes, with the result that its adverse consequences can be avoided, these processes still have certain disadvantages. These include the adverse effect of large amounts of antistatic agents on the productivity of the catalyst, with the result that only very low catalyst yields can be achieved in some cases. Moreover, it is frequently impossible to prepare ethylene polymers having high bulk densities with a concomitant use of antistatic agents.

It is an object of the present invention to provide a novel process for preventing deposition on the reactor wall, by means of which the disadvantages to date can be avoided and which permits in particular the preparation of ethylene polymers having high bulk densities.

We have found that this object is achieved by a process for the preparation of homopolymers of ethylene or copolymers of ethylene with minor amounts of other $C_3$–$C_{12}$-alk-1-enes by catalytic polymerization in a suspension or in the gas phase in the presence of an antistatic agent at from 50° to 120° C. and from 5 to 50 bar, wherein the antistatic agent used is a mixture of the following substances:

a) a metal salt of medialanic acid of the formula (I)

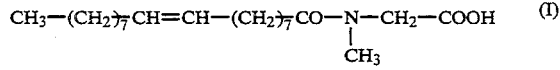  (I)

b) a metal salt of an anthranilic acid of the general formula (II)

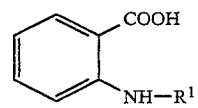  (II)

where the organic radical $R^1$ is either

α) —CO—(CH$_2$)$_x$—CH$_3$   (IIIα)

or

β) —CO—(CH$_2$)$_y$—CH=CH—(CH$_2$)$_z$—CH$_3$   (IIIβ)

and x, y and z are each an integer and are from 6 to 18 for x, from 1 to 16 for y, from 1 to 16 for z and from 4 to 17 for y+z, and c) a polyamine obtainable by reacting epichlorohydrin and an aliphatic primary monoamine or an N-alkylalkylenediamine of the general formula (IV)

$R^2NH$—$R^3$—$NH_2$  (IV), where
$R^2$ is $C_8$–$C_{24}$-alkyl and
$R^3$ is $C_2$–$C_6$-alkylene.

In particular, the salts of metals of the first and of the second main group of the Periodic Table of Elements are used as metal salts a) of medialanic acid of the formula (I). The calcium salt of medialanic acid of the formula (I) is particularly preferred.

In particular, the salts of the first and second main groups and those of the fourth to eighth subgroups of the Periodic Table of Elements are used as metal salts b) of anthranilic acid of the general formula (II). The salt of trivalent chromium with anthranilic acid of the general formula (II) is particularly preferred.

Preferred anthranilic acids have a radical $R^1$ of the general formula (IIIα) in which x is an integer of from 10 to 16, in particular 14 or 16. $R^1$ is in particular the radical of palmitic acid (x=14) or of stearic acid (x=16).

Further preferred anthranilic acids include those compounds of the general formula (IIIβ) in which y and z are each an integer of from 4 to 12 and the sum y+z is an integer of from 8 to 16. In particular, the radical of oleic acid in which, in the general formula (IIIβ), y and z are each 7 and y+z is 14 is used for $R^1$.

In the novel process, in particular the reaction product of epichlorohydrin and an aliphatic primary monoamine which has a $C_8$–$C_{24}$-alkyl radical, in particular a $C_{10}$–$C_{20}$-alkyl radical, as the aliphatic radical is used as polyamine c). Examples of particularly suitable aliphatic primary monoamines include decylamine, dodecylamine, tridecylamine and tetradecylamine.

Further preferred polyamines c) are obtainable by reacting epichlorohydrin with an N-alkylalkylenediamine of the general formula (IV), where $R^2$ is in particular $C_{12}$–$C_{18}$-alkyl and $R^3$ is $C_3$-alkylene. Particularly preferred polyamines c) are obtainable by reacting N-tallow-1,3-diaminopropane with epichlorohydrin in a molar ratio of 1:1.5. A reaction of this type is familiar to the skilled worker in plastics technology. Such polyamines c) are sold, inter alia, under the trade name Polyflo® 130 by UOP, Des Plains, Ill., U.S.A.

The metal salts a) and b) are likewise prepared by conventional methods of synthetic chemistry, which are familiar to the average skilled worker.

The metal salts a) and b) are preferably used in the antistatic mixture in ratios such that the weight ratio of the metal salt of medialanic acid a) to the metal salt of anthranilic acid b) is from 1:0.1 to 1:2.0, preferably from 1:0.3 to 1:0.6. Furthermore, the metal salts a) and b) are used in the novel process as an antistatic mixture in amounts such that the weight ratio of the metal salt of medialanic acid a) and the metal salt of anthranilic acid b) on the one hand to the polyamine c) on the other hand is from 1:0.1 to 1:2.0, in particular from 1:0.2 to 1:1.

In the novel process, the components a), b) and c) of the antistatic mixture may be introduced into the polymerization reactor either in pure form, premixed or individually, or in the form of one or more solutions. In a preferred process, the antistatic mixture is introduced into the reactor in the form of a 0.05–50% strength by weight solution in aliphatic or aromatic hydrocarbons, for example in hexane, heptane, hex-1-ene or toluene. Usually, from 0.5 to 50, in particular from 1 to 20 parts by weight of the antistatic mixture of a), b) and c) are used for the preparation of 1,000,000 parts by weight of homo- or copolymer of ethylene.

The novel process for the preparation of homopolymers of ethylene or copolymers of ethylene with minor amounts of other $C_3$–$C_{12}$-alk-1-enes may be carried out both in a suspension and in the gas phase in conventional polymerization reactors. Copolymers of ethylene with minor amounts of other $C_3$–$C_{12}$-alk-1-enes are to be understood as meaning up to 40, in particular up to 30, % by weight of polymerized $C_3$–$C_{12}$-alk-1-enes, for example propylene, but-1-ene, pent-1-ene, 4-methyl-pent-1-ene, hex-1-ene, hept-1-ene or oct-1-ene, as well as mixtures of these $C_3$–$C_{12}$-alk-1-enes. The process may be carried out both continuously and batchwise, in a stirred or fluidized bed at from 50° to 120° C., in particular from 90° to 120° C., and from 5 to 50, in particular from 20 to 40, bar.

The novel process is usually carried out with the aid of titanium- and aluminum-containing Ziegler catalysts or by means of Phillips catalysts based on chromium-containing compounds, Phillips catalysts being preferably used. Examples of particularly suitable Phillips catalysts are disclosed in, inter alia, EP-A 429 937 and DE-A 41 32 894. In the case of these Phillips catalysts, chromium trioxide applied to a metallic carrier is usually used.

With the aid of the novel process using the antistatic mixture which is likewise novel, it is possible to achieve high catalyst productivities without an impairment of the antistatic effect being observed. The resulting polymers of ethylene have, inter alia, a very high bulk density. Their melt flow indices (HLMI), measured at 190° C. and under a load of 21.6 kp according to DIN 53,735, are from 1.0 to 200, in particular from 1.5 to 50, g/10 min.

EXAMPLES

Examples 1a–c according to the invention

The polymerization of ethylene was carried out in a loop reactor having a volume of 6 $m^3$, of the type described in U.S. Pat. No. 3 242 150, in a suspension. Isobutane was used as the suspending medium.

The amount of ethylene in the reaction mixture was kept constant at 14.7 mol of ethylene per 100 mol of the total molar amount of isobutane and monomeric ethylene contained in the reaction mixture.

The polymer concentration in the reaction mixture was 41 kg of polymer per 100 kg of reaction mixture.

A commercial Phillips catalyst from Grace/Worms (type 967BWF1) which was activated beforehand at 580° C. in an air stream for 10 hours and had a chromium content of 1% by weight was used. It consisted essentially of hexavalent chromium and a metal oxide carrier. The amount of the catalyst metered into the reactor was chosen so that there was a constant reactor output of 900 kg of polyethylene/hour with different amounts of antistatic agent (cf. Examples 1a–c in the Table). The antistatic agent consisted of a mixture of (a) 1 part by weight of the calcium salt of medialanic acid, (b) 0.45 part by weight of the chromium salt of oleoyl-anthranilic acid and (c) 0.7 part by weight of a reaction product of N-tallow-1,3-diaminopropane and epichlorohydrin in a molar ratio of 1:1.5.

| | |
|---|---|
| in Example 1a | 7.2 g of antistatic agent, ie. 8 parts by weight, based on 1,000,000 parts by weight of polyethylene produced, of antistatic agent, |
| in Example 1b | 3.6 g of antistatic agent, ie. 4 parts by weight, based on 1,000,000 parts by weight of polyethylene produced, of antistatic agent and |
| in Example 1c | 1.8 g of antistatic agent, ie. 2 parts by weight, based on 1,000,000 parts by weight of polyethylene produced, of antistatic agent | were metered per hour into the reactor in the form of a 1.4% strength by weight solution in n-heptane.

Even in the presence of relatively small amounts of antistatic agent, no deposits formed on the reactor wall during polymerization for several days.

In the Table below, the amount of antistatic agent used, the polymerization temperature and the catalyst productivity are shown for Examples 1a–c according to the invention. This Table furthermore contains, inter alia, the melt flow index and the bulk density of the resulting polymers of ethylene.

COMPARATIVE EXAMPLES 2a–c

The procedure was as in Examples 1 a–c, except that, in accordance with DE-A 35 43 360, component (c), ie. the reaction product of N-tallow-1,3-diaminopropane and epichlorohydrin, was not used in the antistatic agent.

The preparation of a homopolymer having a melt flow index HLMI of 2.0±0.1 g/10 min could be carried out without problems only where the amounts of antistatic agent were up to 8 parts by weight (based on 1,000,000 parts by weight of polyethylene). In the case of 4 parts by weight of antistatic agent, irregular disturbances due to deposits on the reactor walls occurred after operation for only a few hours. With 2 parts by weight of antistatic agent, the polymerization had to be terminated after only 0.5 hour owing to deposits on the reactor wall. High polyethylene bulk densities and good catalyst productivities, as in the case of the procedure according to the invention (Example 1c), could not be achieved.

In the Table below, the amount of antistatic agent used, the polymerization temperature and the catalyst productivity are shown for Comparative Examples 2a–c. This Table furthermore contains, inter alia, the melt flow index and the bulk density of the resulting polymers of ethylene.

COMPARATIVE EXAMPLES 3 a-c

The procedure was as described in Examples 1 a-c, except that, in accordance with U.S. Pat. No. 4 182 810, the antistatic agent Stadis ® 450 (commercial product from DuPont, USA) was used. Stadis ® 450 contained amounts of the reaction product of epichlorohydrin and N-tallow-1,3-diaminopropane which was similar to the amount of the novel antistatic agent but contained no calcium salt of medi-alanic acid and no chromium salt of oleoylanthranilic acid.

With up to 4 parts by weight, based on 1,000,000 parts by weight of polyethylene, of antistatic agent it was still possible to prepare polyethylene without problems. With 2 parts by weight of antistatic agent per 1,000,000 parts by weight of polyethylene, the formation of lumps occurred after only a few hours, and the polymerization had to be terminated after one day owing to wall deposits in the reactor.

High polyethylene bulk densities and good catalyst productivities, as in the procedure according to the invention (for example according to Example 1c), could not be achieved in this manner.

In the Table below, the amount of antistatic agent used, the polymerization temperature and the catalyst productivity are shown for Comparative Examples 3 a-c. This Table furthermore contains, inter alia, the melt flow index and the bulk density of the resulting polymers of ethylene.

TABLE

| Examples | Process parameters and polyethylene properties | | | | | | | | |
|---|---|---|---|---|---|---|---|---|---|
| | 1a | 1b | 1c | 2a | 2b | 2c | 3a | 3b | 3c |
| Antistatic agent [parts by weight, based on 1,000,000 parts by weight of PE] | 8 | 4 | 2 | 8 | 4 | 2 | 8 | 4 | 2 |
| Polymerization temp. [°C.] | 105.2 | 105.5 | 105.7 | 104.9 | 105.2 | — | 104.3 | 104.4 | 105.0 |
| Catalyst [g/h] | 290 | 200 | 145 | 333 | 265 | — | 295 | 270 | 240 |
| Cat. productivity [g of PE/g of cat.] | 3100 | 4500 | 6100 | 2700 | 3500 | — | 3400 | 3700 | 4200 |
| Polymerization problems due to wall deposits | no | no | no | no | yes/irregular | yes | no | no | yes |
| HLMI 190° C./21.6 kp [g/10 min] according to DIN 53,735 | 2.1 | 2.0 | 2.1 | 1.9 | 2.0 | — | 2.1 | 2.0 | 2.0 |
| PE bulk density [g/l] according to DIN 53,468 | 440 | 485 | 520 | 440 | 480 | — | 450 | 475 | 480 |

We claim:

1. A process for the preparation of homopolymers of ethylene or copolymers of ethylene with minor amounts of other $C_3-C_{12}$-alk-1-enes by catalytic polymerization in a suspension or in the gas phase in the presence of an antistatic agent at from 50° to 120° C. and from 5 to 50 bar, wherein the antistatic agent used is a mixture of the following substances:

a) a metal salt of medialanic acid of the formula (I)

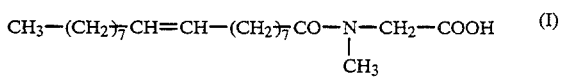

b) a metal salt of an anthranilic acid of the formula (II)

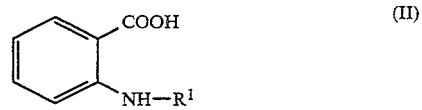

where the organic radical $R^1$ is either

α)  (IIIα)

or

 (IIIβ)

and x, y and z are each an integer and are from 6 to 18 for x, from 1 to 16 for y, from 1 to 16 for z and from 4 to 17 for y+z, and c) a polyamine obtainable by reacting epichlorohydrin and an aliphatic primary monoamine or an N-alkylalkylenediamine of the formula (IV)

 (IV), where $R^2$ is $C_8-C_{24}$-alkyl and
$R^3$ is $C_2-C_6$-alkylene.

2. A process as claimed in claim 1, wherein the corresponding calcium salt is used as metal salt a) of medialanic acid of the formula (I).

3. A process as claimed in claim 1, wherein the corresponding salt of trivalent chromium is used as metal salt b) of anthranilic acid of the formula (II).

4. A process as claimed in claim 1, wherein an organic radical of the formula (IIIβ), where y and z are each 7, is used as the organic radical $R^1$ in the metal salt of anthranilic acid of the formula (II).

5. A process as claimed in claim 1, wherein the reaction product of epichlorohydrin and an N-alkylalkylenedi-amine of the formula (IV), where $R^2$ is $C_{12}$–$C_{18}$-alkyl and $R^3$ is $C_3$-alkylene, is used as polyamine c).

6. A process as claimed in claim 1, wherein the metal salt of medialanic acid a) and the metal salt of anthranilic acid b) are used in a weight ratio of a) to b) of from 1:0.1 to 1:2.0.

7. A process as claimed in claim 1, wherein the metal salt of medialanic acid a), the metal salt of anthranilic acid b) and the polyamine c) are used in a weight ratio of a) and b) on the one hand to c) on the other hand of from 1:0.1 to 1:2.0.

8. A process as claimed in claim 1, wherein the antistatic agent comprising the substances a), b) and c) is used in amounts such that they are from 0.5 to 50 parts by weight of the antistatic agent per 1,000,000 parts by weight of homo- or copolymer of ethylene.

9. A process as claimed in claim 1, wherein the polymerization is carried out with the aid of a conventional Phillips catalyst.

* * * * *

UNITED STATES PATENT AND TRADEMARK OFFICE
CERTIFICATE OF CORRECTION

PATENT NO.: 5,414,064

DATED: May 9, 1995

INVENTOR(S): LUX et al.

It is certified that error appears in the above-identified patent and that said Letters Patent is hereby corrected as shown below:

On title page, item [57], second column line 9, delete "(II$\alpha$)"

and substitute --(III$\alpha$)--.

Signed and Sealed this

Twenty-ninth Day of August, 1995

Attest:

BRUCE LEHMAN

*Attesting Officer*     *Commissioner of Patents and Trademarks*